United States Patent
Van Deventer et al.

(10) Patent No.: US 7,691,198 B2
(45) Date of Patent: Apr. 6, 2010

(54) DRY MIX CEMENT COMPOSITION, METHODS AND SYSTEMS INVOLVING SAME

(75) Inventors: Jan Stephanus Jakob Van Deventer, Brighton (AU); Dingwu Feng, Brunswick (AU); Peter Duxson, Northcote (AU)

(73) Assignee: Zeobond Research Pty Ltd (AU)

( * ) Notice: Subject to any disclaimer, the term of this patent is extended or adjusted under 35 U.S.C. 154(b) by 0 days.

(21) Appl. No.: 12/239,335

(22) Filed: Sep. 26, 2008

(65) Prior Publication Data

US 2009/0071374 A1    Mar. 19, 2009

Related U.S. Application Data

(63) Continuation of application No. PCT/AU2007/000408, filed on Mar. 29, 2007.

(30) Foreign Application Priority Data

Mar. 29, 2006    (AU) .............................. 2006901579

(51) Int. Cl.
C04B 12/04    (2006.01)
(52) U.S. Cl. ...................... 106/600; 106/737
(58) Field of Classification Search ................ 106/600, 106/737
See application file for complete search history.

(56) References Cited

U.S. PATENT DOCUMENTS

| | | | |
|---|---|---|---|
| 4,285,598 A | | 8/1981 | Horton |
| 4,349,386 A | | 9/1982 | Davidovits |
| 4,472,199 A | | 9/1984 | Davidovits |
| 4,509,985 A | | 4/1985 | Davidovits et al. |
| 4,859,367 A | * | 8/1989 | Davidovits .................. 588/252 |
| 5,342,595 A | * | 8/1994 | Davidovits et al. ........ 423/328.1 |
| 5,539,140 A | * | 7/1996 | Davidovits ..................... 588/3 |
| 5,565,028 A | | 10/1996 | Roy et al. |
| 5,798,307 A | * | 8/1998 | Davidovits et al. .......... 501/95.2 |
| 5,820,668 A | * | 10/1998 | Comrie ........................ 106/600 |
| 6,818,055 B2 | | 11/2004 | Schelinski |
| 7,294,193 B2 | * | 11/2007 | Comrie ........................ 106/707 |
| 2004/0187740 A1 | | 9/2004 | Timmons |
| 2005/0172860 A1 | | 8/2005 | Davidovits et al. |
| 2008/0028995 A1 | * | 2/2008 | Barlet-Gouedard et al. . 106/811 |

FOREIGN PATENT DOCUMENTS

| | | |
|---|---|---|
| EP | 0518980 A1 | 12/1992 |
| FR | 2528818 A1 | 12/1983 |
| FR | 2 621 260 A1 | 4/1989 |
| FR | 2659319 A1 | 9/1991 |
| FR | 2669918 A1 | 6/1992 |

(Continued)

OTHER PUBLICATIONS

T. Bakharev; Geopolymeric materials prepared using Class F fly ash and elevated temperature curing; publication; Jun. 21, 2004; pp. 1224-1232, 9 pages; vol. 35; Elsevier Ltd.

*Primary Examiner*—Paul Marcantoni
(74) *Attorney, Agent, or Firm*—Reinhart Boerner Van Deuren P.C.

(57) ABSTRACT

A dry mix cement composition including an alkaline multi-phase aluminosilicate material, wherein the alkaline multi-phase aluminosilicate material provides a source of alkaline and soluble silicate to the cement composition.

26 Claims, 1 Drawing Sheet

FOREIGN PATENT DOCUMENTS

| | | |
|---|---|---|
| FR | 2758323 A1 | 7/1998 |
| GB | 2095569 A | 10/1982 |
| GB | 2247454 A | 3/1992 |
| JP | 2001240438 A | 9/2001 |
| WO | WO 89/02766 A1 | 4/1989 |
| WO | WO 92/04298 A1 | 3/1992 |
| WO | WO 92/04299 A1 | 3/1992 |
| WO | WO 95/13995 A1 | 5/1995 |
| WO | WO 96/25369 A1 | 8/1996 |
| WO | WO 98/31644 A1 | 7/1998 |
| WO | WO 99/10148 A1 | 3/1999 |
| WO | WO 02/44517 A1 | 6/2002 |
| WO | WO 02/094526 A1 | 11/2002 |
| WO | WO 2004/018090 A1 | 3/2004 |
| WO | WO 2005/049522 A1 | 6/2005 |

* cited by examiner

FIGURE 1

DRY MIX CEMENT COMPOSITION, METHODS AND SYSTEMS INVOLVING SAME

CROSS-REFERENCE TO RELATED PATENT APPLICATIONS

This patent application is a continuation of co-pending PCT Application No. PCT/AU2007/000408, filed Mar. 29, 2007, which claims the benefit of Australian Patent Application No. 2006901579, filed Mar. 29, 2006, the entire teachings and disclosure of which are incorporated herein by reference thereto.

BACKGROUND TO THE INVENTION

The present invention relates to a dry mix cement composition. More particularly, the invention relates to a dry mix cement composition that includes an alkaline glassy aluminosilicate material. Generally the alkaline glassy aluminosilicate material is included as a polymerisation aid in a cement composition including other aluminosilicate materials such as fly ash or blast furnace slag. However, it should be noted that in some instances the alkaline glassy aluminosilicate material will be included as the sole component in the composition.

Cements may generally be divided into two groups, those being hydraulic cements and geopolymeric cements. Hardening of conventional hydraulic cements is the result of hydration of calcium aluminates and calcium silicates within the cement composition. In opposition to this, geopolymeric cements result from mineral polycondensation reactions achieved by alkaline activation. This process is sometimes coined as geosynthesis.

In the art of geosynthesis, the term "poly(sialate)" has been adopted to refer to aluminosilicate geopolymers. The sialate network consists of $SiO_4$ and $AlO_4$ tetrahedrons alternatively bound by oxygen atoms. Cations ($Na^+$, $K^+$, $Ca^{++}$, $H_3O^+$) present in the structural cavities of the poly(sialate) balance the negative charge of $Al_3^+$ in coordination (IV).

The empirical formula of polysialates is:

$$Mn\{-(SiO_2)z-AlO_2\}n, wH_2O$$

with M representing the cation K, Na or Ca; n the degree of polymerization; and z being equal to from 1 to 32.

The three-dimensional network (3D) geopolymers are of type:

poly(sialate)M-PS Si:Al=1:1 Mn—(—Si—O—Al—O—)n;    (i)

poly(sialate-siloxo)M-PSS Si:Al=2:1 Mn—(Si—O—Al—O—Si—O—)n;    (ii)

poly(sialate-disiloxo)M-PSDS Si:Al=3:1 Mn—(Si—O—Al—O—Si—O—Si—O—)n.    (iii)

The geopolymeric binders or cements of the types poly(sialate), poly(sialate-siloxo) and poly(sialate-disiloxo), have been the subject of several patents in which their particular properties have been highlighted. One can quote for example the French patents: FR 2.489.290, 2.489.291, 2.528.818, 2.621.260, 2.659.319, 2.669.918, and 2.758.323. Geopolymeric cements of the prior art, for example International Publication Nos. WO92/04298, WO92/04299, WO95/13995, and WO98/31644, are the result of a polycondensation reaction between three distinct mineral reagents:

a) aluminosilicate oxide ($Si_2O_5$, $Al_2O_2$);
b) potassium or sodium disilicate ($Na$, $K)_2(H_3SiO_4)_2$; and
c) calcium disilicate $Ca(H_3SiO_4)_2$ With potassium disilicate, polycondensation is the result of the following chemical reaction:

$$2(Si_2O_5,Al_2O_2)+(Na,K)_2(H_3SiO_4)_2+Ca(H_3SiO_4)_2 \rightarrow$$
$$(K_2O,CaO)(8SiO_2,2Al_2O_3,nH_2O) \quad (1)$$

The geopolymer obtained is of the type (K, Ca)-Poly(sialate-siloxo), (K, Ca)—PSS, with Si:Al=2. Various reactive mineral fillers, such as silica (silica fume), or natural aluminosilicates may be added to the geopolymer.

The reagents a) and b) are industrial reactive products included in the reactive medium. Conversely, ingredient c), calcium disilicate, occurs in a naissant state, in situ, in the strong alkaline medium. Generally, this is a result of a chemical reaction involving calcium silicate, such as calcium mellilite, present in blast furnace slag.

Conventionally, geopolymers are synthesised by using a two part mix including an alkaline soluble silicate solution and a solid mixture of aluminosilicate materials. For instance, a manufacturing process for a geopolymer of the type (Na, K)-poly(sialate-disiloxo), (Na, K)—PSDS, is described in European Patent No. EP 0 518 980. This process exclusively uses an alkaline solution of a very special silica obtained in an electric furnace and the reactive mixture contains sodium or potassium alkaline silicates, but does not include any calcium Ca.

In International Publication No. WO92/04299 a cement containing tecto-alumino-silicates resulting from the reaction between metakaolin, reactive silica, aluminosilicate chemically activated at a temperature between 800° C. and 1200° C., soluble alkali silicate, alkali hydroxide (KOH or NaOH), and calcium silicate is described. The aluminosilicate cement has an atomic ratio Al:Si in the range of 4:6 to 4:14, that is to say a Si:Al ratio varying from 1.5 to 3.5.

More recently, United States Patent Application No. 20050172860 describes a cement binder that contains type (K,Ca)-Poly(sialate-disiloxo), (K,Ca)—PSDS, geopolymer resulting from the reaction between a residual rock from a strongly weathered granitic type, calcium mellilite glass, and a soluble alkaline silicate in which the molar ratio (Na, K)$_2$O: SiO$_2$ ranges between 0.5 and 0.8.

There are many drawbacks associated with traditional two part mixes for the synthesis of geopolymers. The caustic alkaline solutions needed to form the geoploymers make the handling and application of the geopolymers difficult. Also, workability is generally poor and not easily adjustable due to a sticky and thick mortar that is generated during processing. The system is also sensitive to the ratio of alkaline and soluble silicate, which is difficult to control in practice. Still further, the routine practices used in cement industries, such as the construction industry, can not be applied using geopolymeric cements due to their totally different characteristics in terms of rheology, chemistry and workability.

Most importantly, the alkaline and/or soluble silicates that are added during processing cannot be totally consumed during geopolymerisation, even with curing at a raised temperature, due to the existence of dissolution equilibrium of raw aluminosilicate materials in alkaline silicate solutions. This causes severe efflorescence of the final geopolymer products and high permeability and water adsorption due to the movement of alkali together with water to the geopolymer surfaces.

The present invention provides an alternative to the conventional two part mixes and advantageously alleviates one or more of the disadvantages of the prior art.

BRIEF DESCRIPTION OF THE DRAWING

The accompanying drawing incorporated in and forming a part of the specification illustrate several aspects of the present invention and, together with the description, serve to explain the principles of the invention. In the drawing.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

SUMMARY OF THE INVENTION

According to one aspect of the invention there is provided a dry mix cement composition including an alkaline multi-phase aluminosilicate material, wherein the alkaline multi-phase aluminosilicate material provides a source of alkaline and soluble silicate to the cement composition.

As used herein, the term "alkaline multi-phase aluminosilicate material" refers to a material, which may also be coined an alkaline "glassy" aluminosilicate material. The component is not strictly a "glass", but is thermally activated and is multi-phase. Thermal activation of the material may be achieved by a number of mechanisms as will be described hereafter.

The alkaline multi-phase aluminosilicate material may be formed by any suitable means. For example, the alkaline multi-phase aluminosilicate material may be formed by activating an aluminosilicate material in the presence of an alkali. The activation method may include chemical activation, such as calcination, at elevated temperature. In that case, calcination is preferably performed in a furnace or a kiln for up to 4 hours at a temperature of from 150° C. to 1500° C., more preferably 350° C. to 1500° C. Alternatively, activation may include mechanochemical activation, for example by high intensity ultra fine grinding. If so, the ultra fine grinding is preferably performed in an energy-intensive mill in dry state to achieve a small particle size, preferably less than 5 microns. Still further, the activation method may include microwave heating. In that case, the microwave heating is preferably performed in a microwave heating system until a matte is formed. Thermal activation may also be achieved using infrared or electromagnetic energy.

The activation will generally incorporate the addition of an alkali material, for example of K, Na, Ca and Li, or carbonates of K, Na, Ca or Li, or silicates of K or Na, or combinations thereof. The dosage of the alkali is preferably from 10-300% w/w of the aluminosilicate material to be activated, more preferably 10-100%.

An oxidant may also be employed in the activation process. The oxidant is not particularly limited and may be selected from the group consisting of sodium peroxide, calcium peroxide, sodium nitrate, potassium nitrate, sodium perborate, sodium percarbonate, sodium hypochlorite, calcium hypochlorite, and calcium percarbonate. The use of an oxidant may advantageously increase the activation efficiency. If used, the oxidant dosage is preferably from 10-200% w/w of the alkali material, more preferably 10-100%.

The selection of aluminosilicate material to be used to form the alkaline multi-phase aluminosilicate material is not particularly limited. More specifically, the aluminosilicate material employed can include any naturally occurring aluminosilicate minerals such as shales, clays, feldspars, plagioclase, feldspathic materials, zeolite, pyroxene, and amphibole. It may also include volcanic ashes such as pozzolan. The aluminosilicate material used to form the alkaline multi-phase aluminosilicate material may also include industrial aluminosilicate by-products such as mine tailings, flyashes, slags, red mud from aluminium industry and discards from coal or ore mining and Portland cements. The aluminosilicate material used to form the alkaline multi-phase aluminosilicate material may, of course, include any combination of these naturally occurring and industrially derived aluminosilicates.

It is also noted here that "flyashes" is intended to include all types of combustion residues derived from coal power stations, including but not limited to bottom ash and products of processing such residues including fine grinding and that "slags" is intended to include all types of metallurgical slags.

The Si/Al ratio in the aluminosilicate material or mixture of aluminosilicate materials used to form the alkaline multi-phase aluminosilicate material is preferably from 1 to 6, more preferably from 1 to 4. A Si/Al ratio of 2 is still more preferred.

In order to accelerate the polymerisation process, the alkaline multi-phase aluminosilicate material is preferably ground to an average particle size of less than 50 microns. More preferably, the material is ground to a particle size of less than 25 microns. The reduction may be achieved by any suitable means. For example, grinding may be achieved using a ring mill, ball mill or other milling equipment.

The dry mix cement composition may include the single component as described in the preceding paragraphs. However, in order to reduce costs, it is preferred that at least one additional aluminosilicate material be included in the composition. This additional aluminosilicate material will generally be in the raw state and will not be put through the activation process described above.

Once again, the type of additional aluminosilicate material included in the composition is not particularly limited. For example, the additional aluminosilicate material may include natural aluminosilicate minerals such as feldspars, plagioclase, feldspathic materials, zeolite, pyroxene and amphibole. The additional aluminosilicate material may also include volcanic ashes, such as pozzolan. Industrial by-products such as discards from mine or coal processing, and red mud and mine tailings from minerals processing may also be included as the additional aluminosilicate material. This advantageously allows for the use of a mining waste produced during the extraction of coal, in place of residual rock of the weathered granitic type. Once again, any combination of these materials may be employed.

The additional aluminosilicate material or mixture of materials is preferably ground to an average particle size of less than 50 microns. Once again, a smaller particle size of around 25 microns or less is preferred and grinding may achieved by any suitable means.

The additional aluminosilicate material may be included in an amount of from 0-97% w/w of the dry mix cement composition. The inclusion of this component will generally be a function of economics, activity of the raw materials and strength requirements for the final product.

The dry mix cement composition may also include, as a source of calcium, a glassy calcium silicate material (i.e. a Ca-glass). It has been found that the use of a glassy calcium silicate material, such as a calcined glass of a calcium rich aluminosilicate material such as slag, may advantageously facilitate a reduction in the setting time of the dry mix cement composition and an increase in early strength.

The glassy calcium silicate material may include a calcium rich aluminosilicate residue from pyrometallurgical processes for iron, steel and other non-ferrous metals production, such as blast furnace slags. It may also include volcanic ashes, such as pozzolan. The glassy calcium silicate may also be a mixture of materials.

The glassy calcium silicate material is preferably ground to an average particle size of less than 50 microns. A smaller particle size of around 25 microns or less is once again preferred. Again, grinding may be achieved by any suitable means. The glassy calcium silicate material is preferably included in an amount of from 0-97% w/w of the dry mix cement composition.

The dry mix cement composition may further include a glassy sodium or potassium silicate material (i.e. a Na or K-glass). It has been found that the addition of a glassy sodium or potassium silicate material, such as a calcined glass of an aluminosilicate material such as feldspar or clay, in addition to a glassy calcium silicate material facilitates the manipulation of a number of properties of the final product, including setting time, workability, shrinkage and strength development.

If desired, a setting control agent may also be included in the dry mix cement composition. If so, this component is preferably selected from the group consisting of calcium oxide, calcium hydroxide, calcium bromide, calcium nitrate, calcium nitrite, calcium chloride, sodium bromide, gypsum and combinations thereof.

The average particle size for the setting control agent is preferably less than 50 microns. A smaller particle size of around 25 microns or less is preferred. Again, grinding may be achieved by any suitable means. The setting control agent may be included in an amount of from 0% to 50% w/w of the dry mix cement composition. The inclusion of this component will generally be dependent on setting time requirements and strength requirements for the final product.

The rheology of the dry mix cement composition is quite similar to Portland cement. In addition, the alkalinity in the dry mix cement composition is quite low, comparable to that of Portland cement. This translates in terms of additives that may be included in the dry mix cement composition in so far as chemicals used in the cement industry may also be used in the dry mix cement composition. Also, application processes seen in the cement industry may be adopted when using the dry mix cement composition.

Portland cement may be added to the dry mix cement composition if desired, preferably up to 30% (w/w). This component can advantageously be used as an active calcium source which accelerates geopolymerisation and may improve the final product, especially where the Si/Al ratio in the alkaline multi-phase aluminosilicate material is lower than 2. This is because the Portland cement provides a further source of soluble silicate in addition to providing calcium to the system.

The dry mix cement composition may advantageously be enhanced by coupled activation by solid activators. For example, sodium sulphate may be included in the dry mix cement composition, preferably in an amount of up to 8% (mass ratio of the dry mix), more preferably up to 5%. Addition of sodium sulphate has been found to increase compressive strength of cement products formed from the dry mix cement composition and reduce shrinkage. Other sulphates may equally be suitable as would be appreciated by those of skill in the art.

As will be described in more detail below in relation to further aspects of the invention, final products formed from the dry mix cement composition may be enhanced by coupled activation by liquid activators. For example, the use of alkaline, alkaline carbonate and/or alkaline silicate solutions (Na and/or K based) in accordance with standard so-called "two-part" formulations may provide added advantages.

More particularly, as will be discussed below in more detail, it has been found that substantial advantages may be provided through the use of multiple activators applied sequentially with a specified timing of addition and amount of addition during preparation of the final cement product. For example, properties such as rheology, strength development profile, shrinkage and so on can advantageously be manipulated.

It has further been found that the dry mix cement composition may be enhanced by retardation of activation of glassy materials within the composition by selective absorption of carboxylic acids and/or polycarboxylic acids to the surface of the glassy materials. For example, 2,3-dihydroxybutanedioic acid, commonly known as tartaric acid, has been found suitable for this purpose.

In order to improve homogeneity of the dry mix cement composition and strength of the final product, the various components of the composition are preferably ground to a desired particle size together. Preferably, the particle size is as fine as possible so as to minimise any separation of the particles due to density differences between the particles, especially in the presence of vibrations during sample preparation.

It has been found that a combination of alkaline multi-phase aluminosilicate material and a calcium source material, such as those described above and particularly calcium hydroxide or other calcium salt, with the alkaline multi-phase aluminosilicate material in the substantial majority, provides a strong adhesive composition on the addition of aqueous solution. As such, according to another aspect of the invention there is provided a dry mix adhesive composition including a major proportion of alkaline calcium-rich multi-phase aluminosilicate material and a minor proportion of a calcium source material.

According to this embodiment, which is specifically designed to provide an adhesive that may be useful, for example, for adhesion of concrete, cellulose and steel structures, the amount of alkaline calcium-rich multi-phase aluminosilicate material is preferably about 97%, with the remaining 3% of the composition being made up by the calcium source material.

Following from the above, according to a further aspect of the invention there is provided a dry mix cement composition including:
 a) an alkaline multi-phase aluminosilicate material;
 b) an additional aluminosilicate material; and
 c) a calcium source material.

The calcium source material is preferably a glassy calcium aluminosilicate material as described above and/or a setting time control agent selected from the group consisting of calcium hydroxide, calcium oxide, calcium silicate, calcium carbonate, gypsum and other calcium salt.

The particles of the dry mix cement composition are preferably less than 50 microns. As previously mentioned, the average diameter grain size distribution for the alkaline multi-phase aluminosilicate material is preferably less than 50 microns and more preferably around 25 microns. For the additional aluminosilicate material this is preferably less than 25 microns, and for the glassy calcium aluminosilicate material and the setting time control agent this is preferably less than 25 microns. A finer size fraction is preferred to accelerate the polymerisation process. Again, most preferably the components of the dry mix cement composition are ground together to as fine a particle size as possible.

The atomic ratio Si:Al of the aluminosilicate compounds in this mixture is again preferably between 1 and 6, more preferably from 1 to 4 Still more preferably the Si:Al ratio of the aluminosilicate compounds is about 2.

The principal advantage of the invention resides in the possibility of forming a one part dry mix cement composition that on the addition of an aqueous solution, generally water, forms an amorphous vitreous matrix comprising aluminosilicate compounds. The alkaline multi-phase aluminosilicate material provides a source of alkaline and soluble silicate, and undergoes polymerisation with the action of water. Therefore, in effect, the alkaline multi-phase aluminosilicate material forms an artificial gel with a desired composition. The addition of a small amount of the gel forming alkaline multi-phase aluminosilicate material as a polymerisation aid in combination with additional, raw aluminosilicate materials will result in the formation of strong geopolymeric products. The strength of the final geopolymeric products can be modified through the addition of the alkaline multi-phase aluminosilicate material in different quantities.

The presence of calcium ions enhances the polymerisation and increases the setting time. Therefore, the glassy calcium aluminosilicate material, which may include blast furnace slags or the like, advantageously acts as a glassy calcium source. Alternatively, or in addition, the calcium ions may be provided by the setting time control agent that provides the added advantage of controlling the setting time for the cement composition and final product strength.

The scientific analysis of the geopolymeric cements formed from the dry mix cement composition of this aspect of the invention may be performed using electron microscope micro-beam analysis. With this technique it is possible to determine unambiguously the chemical composition of the three principal components included in the cements, namely:

(i) the amorphous vitreous matrix;
(ii) the particles of the glassy calcium materials;
(iii) the additional aluminosilicate material particles (fly-ashes, feldspars, plagioclase, feldspathic material, zeolite, pyroxene, amphibole) and quartz.

With action of water, as previously mentioned, the dry mix cement composition forms an amorphous vitreous matrix. The gel formed consists of a mixture of different varieties of aluminosilicate compounds in which the average atomic ratio Si:Al generally varies from 1 to 6. The remaining components of the formed amorphous aluminosilicate matrix, such as glassy calcium material particles, aluminosilicate particles and quartz particles, are not used in the Si:Al atomic ratio calculation.

The average value of the atomic ratio Al:(Na, K) in the amorphous vitreous matrix is preferably close to 1. The average value of the atomic ratio Si:Ca in the amorphous vitreous matrix is preferably in the range of from 5 to 50.

The components for the dry mix cement composition according to this aspect of the invention may be selected from those previously described. Likewise, additional components may be included if desired. For example, up to 30% Portland cement may be included for reducing gas and water permeability. Other materials such as sand or other fillers and aggregates may also be included.

According to another aspect of the invention there is provided a method of forming a cement including:

(i) providing a dry mix cement composition as described above;
(ii) adding an aqueous solution, to the dry mix cement composition to form a mortar; and
(iii) allowing the mortar to cure or curing the mortar to form the cement.

The addition of the aqueous solution, which is in some instances preferably water, to the cement composition may be achieved using traditional mixing methods. That is, the cement composition and aqueous solution, are mixed with agitation. The aqueous solution is added in a desired amount relative to the cement composition. Preferably, water is added in an amount of from 25% to 45% (water to dry mix in mass), and more preferably in an amount of about 35%.

The curing of the cement may be achieved by simply allowing the cement to stand, as with conventional cements. Alternatively, or in addition, curing may be assisted by applying heat or steam. Preferably, the curing is conducted at 100% humidity without addition of water.

The invention also provides for mortars, cements, concretes, pastes and adhesives formed using the dry mix compositions of the invention as described in the preceding paragraphs.

Compared with conventional Portland cement, the dry mix cement compositions of the invention advantageously provide one or more of better fire and chemical resistance, lower water adsorption and permeability, lower shrinkage, comparable strength or higher, lower cost, and may be applied by similar application methods.

Compared with conventional amorphous aluminosilicate materials, the dry mix cement compositions of the invention have the advantages of one or more of better fire and chemical resistance, lower water adsorption and permeability, lower shrinkage, easier handling and application, lower costs, and may be applied like conventional cements.

In many embodiments of the invention it will be advantageous, and particularly good results may be obtained, if a number of activators are added to the dry mix cement composition at predetermined intervals as desired for a particular application. In practice, this causes some problems insofar as systems available for mixing of such materials, such as cements, do not generally consider such a requirement.

Therefore, according to another aspect of the invention there is provided a system for forming a mortar from a dry mix cement composition as described above, the system including:

an agitation vessel for housing the dry mix cement composition;

at least a first storage vessel for housing an activator for the dry mix cement composition in fluid communication with the agitation vessel; and a control system for controlling the addition of the activator from the first storage vessel to the dry mix cement composition.

The provision of a storage vessel in fluid communication with the agitation vessel and a control system for controlling the addition of activator stored within the storage vessel advantageously provide for the effective and timely mixing of the two component as desired in a particular instance.

In some cases, it may be desirable to introduce a number of activators to the agitation vessel, in which case, the system preferably includes at least a second storage vessel for housing an additional activator for the dry mix cement composition in fluid communication with the agitation vessel. In that case, the control system preferably also controls the addition of additional activator from the second storage vessel to the dry mix cement composition.

Generally, a water storage vessel is provided that is in fluid communication with one or both of the first storage vessel and the second storage vessel. The water storage vessel may also be in fluid communication with the agitation vessel.

The control system may be manual, including a number of manually operated valves and pumps. However, this is not optimal and may in some instances be inappropriate. Preferably, the control system includes a computer control that can be programmed to control addition of the activator from the first storage vessel and the addition of the additional activator from the second storage vessel to the dry mix cement composition.

In a particular embodiment of this aspect of the invention, the system is provided on a cement mixing vehicle. As such, in one embodiment, the agitator vessel is a drum located on a cement mixing vehicle.

According to a further aspect of the invention there is provided the use of a system as described above for mixing a dry mix cement composition according to the invention with at least one activator.

DETAILED DESCRIPTION OF THE INVENTION

A schematic illustration of a system as described above is provided in FIG. 1. The illustrated system, which will be discussed in detail below, is intended for use on a cement mixing vehicle. It will be appreciated that the illustrated embodiment is provided for exemplification purposes only and should be in no way construed as limiting on this aspect of the invention.

Figure 1:
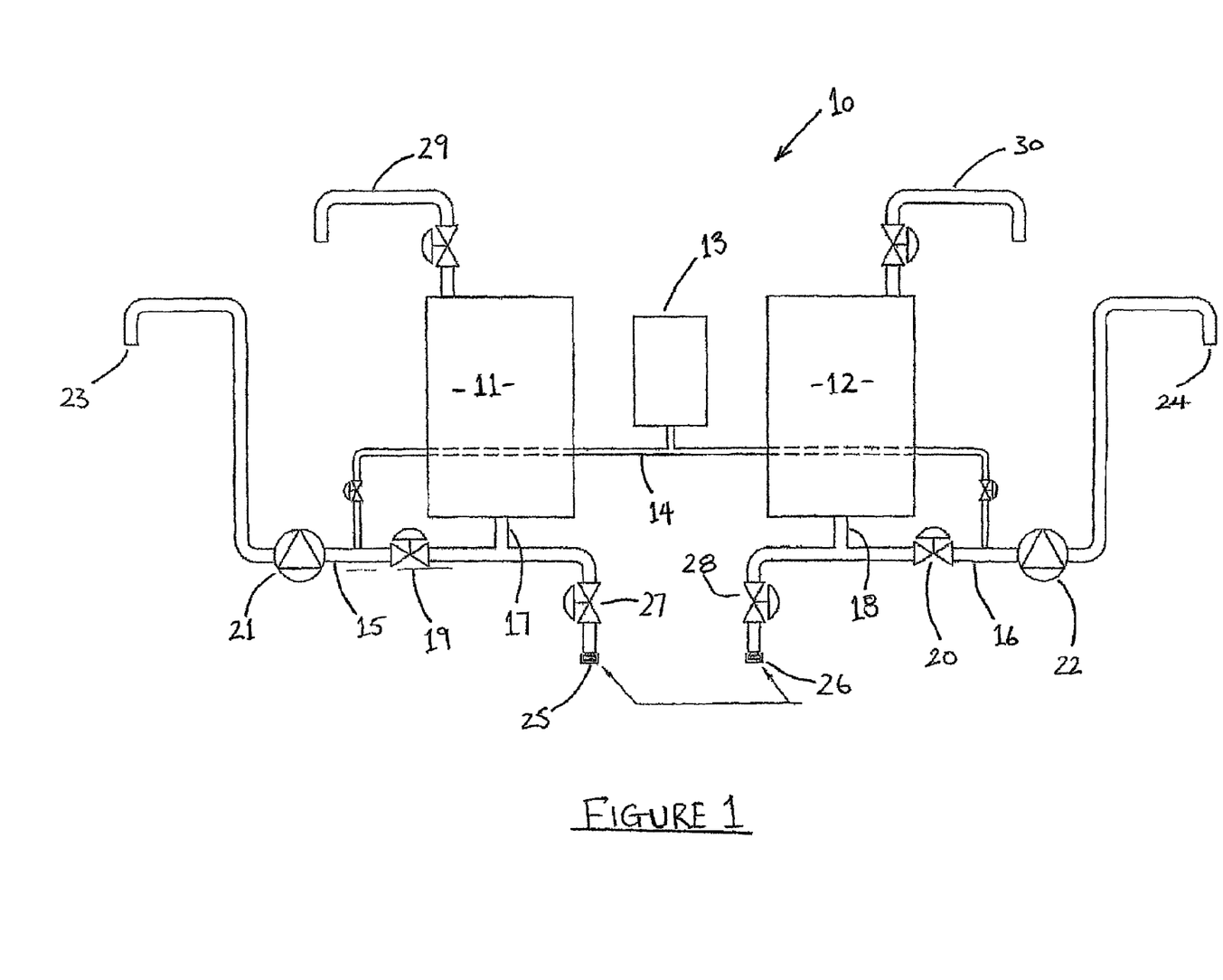
FIG. 1 illustrates a system for mixing a dry mix cement composition according to an embodiment of the present invention.

Turning to FIG. 1, a system 10 is provided that is located on a cement mixing vehicle (not shown). The system includes a first storage vessel 11 and a second storage vessel 12. Each of the storage vessels 11, 12 store a particular activator for a dry mix cement composition that is contained within the drum (not shown) of the cement mixing vehicle.

A water storage vessel 13 is provided between the storage tanks 11, 12 and may be in fluid communication with the storage vessels 11, 12 via a conduit 14. Alternatively, the conduit 14 may pass directly to a pair of supply conduits 15, 16 that supply activator from the storage vessels 11, 12 to the drum (not shown) of the cement mixing vehicle.

The storage vessels 11, 12 include lower outlets 17, 18 that connect with the supply conduits 15, 16 via valves 19, 20. Activator held within the storage vessels 11, 12 may be pump through the supply conduits 15, 16 by means of pumps 21, 22. Outlets 23, 24 to the supply conduits 15, 16 lead to the drum (not shown) of the vehicle.

Supply inlets 25, 26 are also provided to facilitate feeding of activator into the storage vessels 11, 12. Valves 27, 28 are also provided to open and close the inlets 25, 26. Upper outlets 29, 30 are also provided to facilitate transfer of activator to a catch can (not shown).

The storage vessels 11, 12 generally have a storage capacity in the order or 20-200 L per cubic metre of the drum of the vehicle, although larger vessels of up to 400 L per cubic metre may be suitable in some instances. Generally, a storage capacity of from 50-100 L per cubic metre will suffice. Additional smaller vessels having a storage capacity of about 5-60 L may also be provided for additional activators if desired.

Materials of construction of the pumps, valves, conduits and other components are not particularly limited. Generally, these will be selected from polypropylene, stainless steel 316, EPDM, Santoprene, PTFE and Viton. However, polypropylene is preferred.

EXAMPLES

The dry mix cement composition will now be illustrated with reference to the following examples. These examples are provided for illustration only and should not be considered limiting on the invention in any way. In particular, the following examples include relatively small amounts of alkaline multi-phase aluminosilicate powders as a polymerisation aid. As previously noted, in alternative embodiments much higher amounts of the alkaline multi-phase aluminosilicate material may be present. Indeed, in certain applications this component may be the sole component in the cement composition. This will, however, generally be precluded due to the high costs of such materials. All indicated parts below are by weight.

Example 1

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.82 kg water

Setting time: 2 h at 20° C. and 1 h 15 min at 35° C.

Compressive strength (20° C. curing and 100% humidity): 6.8 MPa@1 d, 21.5 MPa@7 d, 27.3 MPa@14 d, 35.3 MPa@28 d.

Example 2

The polymerisation aid: 1 kg potash feldspar (67.1% w/w SiO2, 17.6% $Al_2O_3$, 3.16% Na2O, 10.6% $K_2O$, 0.18% CaO and 0.21% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 8.5% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 43.75% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 43.75% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.72 kg water

Setting time: 2 h 30 min at 20° C. and 1 h 45 min at 35° C.

Compressive strength (20° C. curing and 100% humidity): 8.1 MPa@1 d, 14.1 MPa@7 d, 25.1 MPa@14 d, 34.2 MPa@28 d.

Example 3

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 600 g sodium hydroxide of 100 microns are dry mixed evenly and calcined in a furnace at 650° C. for 2 h at a temperature increase rate of 110° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2.0% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.73 kg water

Setting time: 2 h min at 20° C. and 1 h 10 min at 35° C.

Compressive strength (20° C. curing and 100% humidity): 5.3 MPa@1 d, 8.5 MPa@7 d, 14.1 MPa@14 d, 18.2 MPa@28 d.

Example 4

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2.0% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 3.4 kg dry mix, 6.8 kg of fine washed sand of an average particles size of 200 microns and 1.14 kg water Setting time: 2 h min at 20° C. and 1 h 10 min at 35° C.

Compressive strength (20° C. curing and 100% humidity): 4.6 MPa@1 d, 8.1 MPa@7 d, 13.5 MPa@14 d, 16.8 MPa@28 d.

Example 5

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 4.5% $Ca(OH)_2$, and 91.5% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.73 kg water

Setting time: 1 h 30 min at 20° C. and 50 min at 35° C.

Compressive strength (20° C. curing and 100% humidity): 0.6 MPa@1 d, 5.0 MPa@7 d, 7.1 MPa@14 d, 10.2 MPa@28 d.

Example 6

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2.0% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.73 kg water

Setting time: 2 h 5 min at 20° C. and 1 h 20 min at 35° C.

Compressive strength (20° C. curing and 100% humidity): 5.2 MPa@1 d, 8.4 MPa@7 d, 14.5 MPa@14 d, 18.8 MPa@28 d.

Example 7

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.73 kg water

Setting time: 2 h 10 min at 20° C. and 1 h 30 min at 35° C.

Compressive strength (20° C. curing and 100% humidity): 10.0 MPa@1 d, 16.5 MPa@7 d, 25.8 MPa@14 d, 32.5 MPa@28 d.

Example 8

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.4 kg dry mix, 4.8 kg washed sand (mixture of 50% fines of an average particles size of 200 microns and 50% coarse of an average size of 1.2 mm) and 1.10 kg water Setting time: 2 h 10 min at 20° C. and 1 h 30 min at 35° C.

Compressive strength (20° C. curing and 100% humidity): 7.5 MPa@1 d, 16.8 MPa@7 d, 23.5 MPa@14 d, 28.2 MPa@28 d.

Example 9

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 8.5% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 43.75% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 43.75% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.79 kg water

Setting time: 2 h 50 min at 20° C. and 1 h 45 min at 35° C.

Compressive strength (20° C. curing and 100% humidity): 8.1 MPa@1 d, 13.8 MPa@7 d, 18.5 MPa@14 d, 27.8 MPa@28 d.

Example 10

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 110° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 8.5% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 43.75% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 43.75% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.4 kg dry mix, 4.8 kg washed sand (mixture of 50% fines of an average particles size of 200 microns and 50% coarse of an average size of 1.2 mm) and 0.96 kg water Setting time: 2 h 50 min at 20° C. and 1 h 45 min at 35° C.

Compressive strength (20° C. curing and 100% humidity): 7.2 MPa@1 d, 12.3 MPa@7 d, 17.6 MPa@14 d, 25.4 MPa@28 d.

Example 11

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.4 kg dry mix, 4.8 kg washed sand (mixture of 65% fines of an average particles size of 200 microns and 35% coarse of an average size of 1.2 mm) and 1.05 kg water Setting time: 2 h at 20° C. and 1 h 30 min at 35° C.

Compressive strength (20° C. curing and 100% humidity): 4.1 MPa@1 d, 7.2 MPa@7 d, 12.5 MPa@14 d, 17.3 MPa@28 d.

Example 12

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 500 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 1% $Ca(OH)_2$, 2% $CaSO_4$, 27.9% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.1% Gladstone fly ash (Pozzolanic Enterprises Pty. Ltd., Queensland, Australia, 50% less than 8.47 µm and 1% greater than 110 µm in size, a composition of 46.2%

SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 5 kg dry mix and 1.75 kg water

Setting time: 5 h 30 min at 20° C. and 4 h 10 min at 35° C.

Compressive strength (20° C. curing and 100% humidity): 4.3 MPa@1 d, 6.5 MPa@7 d, 12.1 MPa@14 d, 16.2 MPa@28 d.

Example 13

The polymerisation aid: 1 kg potash feldspar (67.1% w/w SiO$_2$, 17.6% Al$_2$O$_3$, 3.16% Na$_2$O, 10.6% K$_2$O, 0.18% CaO and 0.21% Fe$_2$O$_3$) of 25 microns and 600 g potassium hydroxide of 100 microns are dry mixed evenly and calcined in a furnace at 600° C. for 2 h at a temperature increase rate of 110° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% Ca(OH)$_2$, 28.8% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 5 kg dry mix and 1.75 kg water

Setting time: 2 h 10 min at 20° C. and 1 h 20 min at 35° C.

Compressive strength (20° C. curing and 100% humidity): 4.5 MPa@1 d, 9.6 MPa@7 d, 15.6 MPa@14 d, 18.2 MPa@28 d.

Example 14

The polymerisation aid: 1 kg potash feldspar (67.1% w/w SiO$_2$, 17.6% Al$_2$O$_3$, 3.16% Na$_2$O, 10.6% K$_2$O, 0.18% CaO and 0.21% Fe$_2$O$_3$) of 25 microns and 600 g potassium hydroxide of 100 microns are dry mixed evenly and calcined in a furnace at 600° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% Ca(OH)$_2$, 47% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 47% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 5 kg dry mix and 1.75 kg water

Setting time: 2 h 10 min at 20° C. and 1 h 20 min at 35° C.

Compressive strength (20° C. curing and 100% humidity): 6.8 MPa@1 d, 13.8 MPa@7 d, 18.5 MPa@14 d, 23.6 MPa@28 d.

Example 15

The polymerisation aid: 1 kg albite (occasionally a major gangue mineral in gold or other non-ferrous metal ores, a composition (w/w) of 70.9 SiO$_2$, 17.0% Al$_2$O$_3$, 9.75% Na$_2$O, 0.43% K$_2$O, 0.31% CaO and 0.07% Fe$_2$O$_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% Ca(OH)$_2$, 28.8% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 2.5 kg dry mix and 0.81 kg water

Setting time: 1 h 20 min at 20° C.

Compressive strength (20° C. curing and 100% humidity): 6.9 MPa@1 d, 14.2 MPa@7 d, 18.7 MPa@14 d, 25.9 MPa@28 d.

Example 16

The polymerisation aid: 1 kg albite (occasionally a major gangue mineral in gold or other non-ferrous metal ores, a composition (w/w) of 70.9 SiO$_2$, 17.0% Al$_2$O$_3$, 9.75% Na$_2$O, 0.43% K$_2$O, 0.31% CaO and 0.07% Fe$_2$O$_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% Ca(OH)$_2$, 28.8% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Geopolymer concrete: 1.4 kg dry mix, 2.8 kg washed sand (mixture of 65% fines of an average particles size of 200 microns and 35% coarse of an average size of 1.2 mm) and 0.55 kg water Setting time: 1 h 10 min at 20° C.

Compressive strength (20° C. curing and 100% humidity): 4.9 MPa@1 d, 12.1 MPa@7 d, 16.5 MPa@14 d, 22.8 MPa@28 d.

Example 17

The polymerisation aid: 1 kg potash feldspar (67.1% w/w SiO2, 17.6% Al$_2$O$_3$, 3.16% Na2O, 10.6% K$_2$O, 0.18% CaO and 0.21% Fe$_2$O$_3$) of 25 microns, 100 g calcium carbonate of 25 microns and 400 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% Ca(OH)$_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.84 kg water

Setting time: 3 h 50 min at 20° C.

Compressive strength (20° C. curing and 100% humidity): 7.5 MPa@1 d, 13.8 MPa@7 d, 17.8 MPa@14 d, 23.9 MPa@28 d.

Example 18

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 100 g calcium carbonate of 25 microns and 400 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 1.4 kg dry mix, 2.8 kg washed sand (an average size of 1.2 mm) and 0.55 kg water Setting time: 4 h at 20° C.

Compressive strength (20° C. curing and 100% humidity): 5.7 MPa@1 d, 11.7 MPa@7 d, 15.4 MPa@14 d, 20.4 MPa@28 d.

Example 19

The polymerisation aid: 1 kg clay (a typical discard mineral from coal mining, a composition of 52.16% $SiO_2$, 31.50% $Al_2O_3$, 0.07% $Na_2O$, 2.80% $K_2O$, 0.18% CaO and 0.90% $Fe_2O_3$) of less than 5 microns and 600 g sodium hydroxide of 100 microns are dry mixed evenly and calcined in a furnace at 850° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.80 kg water

Setting time: 3 h 20 min at 20° C.

Compressive strength (20° C. curing and 100% humidity): 7.2 MPa@1 d, 14.7 MPa@7 d, 19.4 MPa@14 d, 26.8 MPa@28 d.

Example 20

The polymerisation aid: 1 kg pyrophyllite (an important raw material extensively used in ceramic industry, a composition of 77.5% $SiO_2$, 17.50% $Al_2O_3$, 0.15% $Na_2O$, 0.75% $K_2O$ and 0.06% $Fe_2O_3$) of less than 50 microns and 600 g sodium hydroxide of 100 microns are dry mixed evenly and calcined in a furnace at 900° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 3.0 kg dry mix and 0.94 kg water

Setting time: 2 h 30 min at 20° C.

Compressive strength (20° C. curing and 100% humidity): 6.8 MPa@1 d, 13.5 MPa@7 d, 17.4 MPa@14 d, 24.6 MPa@28 d.

Example 21

The polymerisation aid: 1 kg pyrophyllite (an important raw material extensively used in ceramic industry, a composition of 77.5% $SiO_2$, 17.50% $Al_2O_3$, 0.15% $Na_2O$, 0.75% $K_2O$ and 0.06% $Fe_2O_3$) of less than 50 microns and 600 g sodium hydroxide of 100 microns are dry mixed evenly and calcined in a furnace at 900° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 1.4 kg dry mix, 2.8 kg washed sand (an average size of 1.2 mm) and 0.50 kg water Setting time: 2 h 30 min at 20° C.

Compressive strength (20° C. curing and 100% humidity): 4.5 MPa@1 d, 10.6 MPa@7 d, 14.7 MPa@14 d, 20.5 MPa@28 d.

Example 22

The polymerisation aid: 1 kg pyrophyllite (an important raw material extensively used in ceramic industry, a composition of 77.5% $SiO_2$, 17.50% $Al_2O_3$, 0.15% $Na_2O$, 0.75% $K_2O$ and 0.06% $Fe_2O_3$) of less than 50 microns and 600 g sodium hydroxide of 100 microns are dry mixed evenly and calcined in a furnace at 900° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 3.0 kg dry mix and 1.01 kg water
Setting time: 1 h 30 min at 20° C.
Compressive strength (20° C. curing and 100% humidity): 6.1 MPa@1 d, 16.2 MPa@7 d, 23.7 MPa@14 d, 30.5 MPa@28 d.

Example 23

The polymerisation aid: 1 kg kaolin (an important raw material extensively used in ceramic industry, a composition of 54.4% $SiO_2$, 29.4% $Al_2O_3$, 0.20% $Na_2O$, 0.20% $K_2O$, 0.20% CaO and 1.4% $Fe_2O_3$) of less than 10 microns and 600 g sodium hydroxide of 100 microns are dry mixed evenly and calcined in a furnace at 800° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.76 kg water
Setting time: 3 h 25 min at 20° C.
Compressive strength (20° C. curing and 100% humidity): 4.0 MPa@1 d, 10.2 MPa@7 d, 13.5 MPa@14 d, 18.8 MPa@28 d.

Example 24

The polymerisation aid: 1 kg kaolin (an important raw material extensively used in ceramic industry, a composition of 54.4% $SiO_2$, 29.4% $Al_2O_3$, 0.20% $Na_2O$, 0.20% $K_2O$, 0.20% CaO and 1.4% $Fe_2O_3$) of less than 10 microns and 600 g sodium hydroxide of 100 microns are dry mixed evenly and calcined in a furnace at 800° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 3.0 kg dry mix and 0.98 kg water
Setting time: 1 h 35 min at 20° C.
Compressive strength (20° C. curing and 100% humidity): 5.1 MPa@1 d, 13.2 MPa@7 d, 19.5 MPa@14 d, 26.8 MPa@28 d.

Example 25

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 400 g sodium carbonate of 100 microns are dry mixed evenly and calcined in a furnace at 800° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.78 kg water
Setting time: 4 h 25 min at 20° C.
Compressive strength (20° C. curing and 100% humidity): 4.0 MPa@1 d, 12.5 MPa@7 d, 17.8 MPa@14 d, 25.4 MPa@28 d.

Example 26

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 400 g sodium carbonate of 100 microns and 60 g $NaNO_3$ of less than 50 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.78 kg water
Setting time: 4 h 25 min at 20° C.
Compressive strength (20° C. curing and 100% humidity): 4.0 MPa@1 d, 10.7 MPa@7 d, 16.6 MPa@14 d, 22.3 MPa@28 d.

Example 27

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 400 g sodium hydroxide and 100 g sodium carbonate of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.81 kg water

Setting time: 1 h 20 min at 20° C.

Compressive strength (20° C. curing and 100% humidity): 6.2 MPa@1 d, 12.4 MPa@7 d, 18.8 MPa@14 d, 26.9 MPa@28 d.

Example 28

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 400 g sodium hydroxide and 100 g sodium carbonate of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.0 kg dry mix, 2.0 kg washed sand of an average particle size of 1.2 mm and 0.69 kg water Setting time: 1 h 20 min at 20° C.

Compressive strength (20° C. curing and 100% humidity): 5.2 MPa@1 d, 10.8 MPa@7 d, 14.2 MPa@14 d, 20.8 MPa@28 d.

Example 29

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 400 g sodium hydroxide and 100 g sodium carbonate of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 5% polymerisation aid, 47.5% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 47.5% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 3.0 kg dry mix and 1.05 kg water

Setting time: 1 h 40 min at 20° C.

Compressive strength (20° C. curing and 100% humidity): 10.2 MPa@1 d, 19.4 MPa@7 d, 26.2 MPa@14 d, 34.5 MPa@28 d.

Example 30

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 400 g potassium hydroxide and 100 g sodium carbonate of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.86 kg water

Setting time: 6 h at 20° C.

Compressive strength (20° C. curing and 100% humidity): 5.3 MPa@1 d, 10.8 MPa@7 d, 15.8 MPa@14 d, 22.6 MPa@28 d.

Example 31

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns and 600 g potassium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2% $Ca(OH)_2$, 28.8% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 67.2% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.82 kg water

Setting time: 5 h 30 min at 20° C.

Compressive strength (20° C. curing and 100% humidity): 5.8 MPa@1 d, 11.6 MPa@7 d, 17.5 MPa@14 d, 24.2 MPa@28 d.

Example 32

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns, 100 g sodium carbonate of 50 microns and 400 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 3% polymerisation aid, 3% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), and 67% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.8 kg dry mix and 0.86 kg water

Setting time: 4 h 10 min at 20° C.

Compressive strength (20° C. curing and 100% humidity): 7.4 MPa@1 d, 20.4 MPa@7 d, 25.5 MPa@14 d, 33.8 MPa@28 d.

Example 33

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns, 100 g sodium carbonate of 50 microns and 400 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 3% polymerisation aid, 30% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), and 67% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.0 kg dry mix, 2.0 kg washed sand of an average particle size of 1.2 mm and 0.87 kg water Setting time: 4 h 10 min at 20° C.

Compressive strength (20° C. curing and 100% humidity): 7.0 MPa@1 d, 19.2 MPa@7 d, 25.7 MPa@14 d, 34.5 MPa@28 d.

Example 34

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 3% polymerisation aid, 30% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 7.7% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 69.3% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.8 kg dry mix and 0.98 kg water

Setting time: 3 h 30 min at 20° C.

Compressive strength (20° C. curing and 100% humidity): 6.8 MPa@1 d, 18.9 MPa@7 d, 24.1 MPa@14 d, 32.5 MPa@28 d.

Example 35

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 3% polymerisation aid, 30% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 7.7% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 69.3% Gladstone fly ash (Pozzolanic Enterprises Pty. Ltd., Queensland, Australia, 50% less than 8.47 μm and 1% greater than 110 μm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Geopolymer concrete: 2.0 kg dry mix, 2.0 kg washed sand of an average size of 1.2 mm and 0.62 kg water Setting time: 3 h 30 min at 20° C.

Compressive strength (20° C. curing and 100% humidity): 9.0 MPa@1 d, 26.1 MPa@7 d, 30.5 MPa@14 d, 35.8 MPa@28 d.

Example 36

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 1.0% Ca(OH)$_2$, 8.5% Portland cement (21.12% SiO$_2$, 4.39% Al$_2$O$_3$, 0.21% Na$_2$O, 0.48% K$_2$O, 0.87% SO$_3$, 65.30% CaO, 1.14% MgO and 3.38% Fe$_2$O$_3$, an average size of less than 105 microns), and 86.5% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 2.5 kg dry mix and 0.77 kg water
Setting time: 1 h 5 min at 20° C.
Compressive strength (20° C. curing and 100% humidity): 4.5 MPa@1 d, 9.1 MPa@7 d, 13.5 MPa@14 d, 17.4 MPa@28 d.

Example 37

The polymerisation aid: 1 kg natural zeolite (predominantly mordenite and clinoptilolite, a composition (w/w) of 71.5% SiO$_2$, 18.5% Al$_2$O$_3$, 1.64% Na$_2$O, 2.66% K$_2$O, 1.75% CaO and 0.07% Fe$_2$O$_3$) of 25 microns and 600 g sodium hydroxide of 100 microns are dry mixed evenly and calcined in a furnace at 800° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4% polymerisation aid, 2.0% Ca(OH)$_2$, 28.2% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$). and 86.5% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 2.5 kg dry mix and 0.83 kg water
Setting time: 2 h 30 min at 20° C.
Compressive strength (20° C. curing and 100% humidity): 5.1 MPa@1 d, 12.4 MPa@7 d, 17.4 MPa@14 d, 22.4 MPa@28 d.

Example 38

The polymerisation aid: 1 kg albite (occasionally a major gangue mineral in gold or other non-ferrous metal ores, a composition (w/w) of 70.9 SiO$_2$, 17.0% Al$_2$O$_3$, 9.75% Na$_2$O, 0.43% K$_2$O, 0.31% CaO and 0.07% Fe$_2$O$_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4.0% polymerisation aid, 1.0% Ca(OH)$_2$, 30% Portland cement (21.12% SiO$_2$, 4.39% Al$_2$O$_3$, 0.21% Na$_2$O, 0.48% K$_2$O, 0.87% SO$_3$, 65.30% CaO, 1.14% MgO and 3.38% Fe$_2$O$_3$, an average size of less than 105 microns), 32.5% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns), and 32.5% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 2.5 kg dry mix and 0.78 kg water
Setting time: 1 h 5 min at 20° C.
Compressive strength (20° C. curing and 100% humidity): 15.2 MPa@1 d, 32.5 MPa@7 d, 39.5 MPa@14 d, 45.3 MPa@28 d.

Example 39

The polymerisation aid: 1 kg Glastone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$) and 800 g sodium hydroxide of 100 microns are dry mixed evenly and calcined in a furnace at 750° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 8.0% polymerisation aid, 2% Ca(OH)$_2$, 45% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns), and 45% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 2.5 kg dry mix and 0.98 kg water
Setting time: 4 h 50 min at 20° C.
Compressive strength (20° C. curing and 100% humidity): 0.5 MPa@1 d, 4.5 MPa@7 d, 8.1 MPa@14 d, 10.2 MPa@28 d.

Example 40

The polymerisation aid: 400 g potash feldspar (67.1% w/w SiO$_2$, 17.6% Al$_2$O$_3$, 3.16% Na$_2$O, 10.6% K$_2$O, 0.18% CaO and 0.21% Fe$_2$O$_3$) of 25 microns and 240 g sodium hydroxide of 100 microns are dry mixed evenly and heated in a microwave oven (1200 W) at 100% power for 35 min h. The formed matte is crushed in a ring mill to an average particle size of less than 25 microns. The alkaline multi-phase aluminosilicate powder is used as a polymerisation aid.

One part dry mix (mass percentage): 4% polymerisation aid, 2.0% Ca(OH)$_2$, 28.2% granulated slag (a glassy calcium aluminosilicate material of 32.49% SiO$_2$, 14.39% Al$_2$O$_3$, 0.27% Na$_2$O, 0.48% K$_2$O, 42.04% CaO, 7.08% MgO and 0.30% Fe$_2$O$_3$, an average size of less than 25 microns) and 65.8% Gladstone fly ash (Pozzolanic Enterprises Pty. Ltd., Queensland, Australia, 50% less than 8.47 μm and 1% greater than 110 μm in size, a composition of 46.2% SiO$_2$, 30.3% Al$_2$O$_3$, 0.27% Na$_2$O, 0.56% K$_2$O, 4.31% CaO, 1.52% MgO, 1.66% TiO$_2$ and 12.6% Fe$_2$O$_3$).

Mortar: 5 kg dry mix and 1.73 kg water
Setting time: 2 h min at 20° C.
Compressive strength (20° C. curing and 100% humidity): 5.6 MPa@1 d, 8.8 MPa@7 d, 14.5 MPa@14 d, 19.2 MPa@28 d.

Example 41

The polymerisation aid: 250 g potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns and 150 g sodium hydroxide of 100 microns are dry ground together in a ring mill for 1 h 30 min. After grinding, the powder has a particle size of less than 2 microns. This mechanochemically activated alkaline multi-phase aluminosilicate powder is used as a polymerisation aid.

One part dry mix (mass percentage): 4% polymerisation aid, 2.0% $Ca(OH)_2$, 28.2% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns) and 65.8% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 5 kg dry mix and 1.73 kg water
Setting time: 2 h min at 20° C.
Compressive strength (20° C. curing and 100% humidity): 5.1 MPa@1 d, 7.2 MPa@7 d, 13.8 MPa@14 d, 17.6 MPa@28 d.

Example 42

The polymerisation aid: 1 kg albite (occasionally a major gangue mineral in gold or other non-ferrous metal ores, a composition (w/w) of 70.9 $SiO_2$, 17.0% $Al_2O_3$, 9.75% $Na_2O$, 0.43% $K_2O$, 0.31% CaO and 0.07% $Fe_2O_3$) of 25 microns and 600 g sodium hydroxide of 100 microns are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid.

One part dry mix (mass percentage): 4.0% polymerisation aid, 2.0% $CaSO_4$, 30% Portland cement (21.12% $SiO_2$, 4.39% $Al_2O_3$, 0.21% $Na_2O$, 0.48% $K_2O$, 0.87% $SO_3$, 65.30% CaO, 1.14% MgO and 3.38% $Fe_2O_3$, an average size of less than 105 microns), 32.0% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns), and 32.0% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 3.0 kg dry mix and 0.99 kg water
Setting time: 3 h 5 min at 20° C.
Compressive strength (20° C. curing and 100% humidity): 11.4 MPa@1 d, 31.5 MPa@7 d, 38.8 MPa@14 d, 44.2 MPa@28 d.

Example 43

The polymerisation aid: 1 kg potash feldspar (67.1% w/w $SiO_2$, 17.6% $Al_2O_3$, 3.16% $Na_2O$, 10.6% $K_2O$, 0.18% CaO and 0.21% $Fe_2O_3$) of 25 microns, 1 kg sodium hydroxide are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as a polymerisation aid, K-glass. 1 kg granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns), 700 g sodium hydroxide are dry mixed evenly and calcined in a furnace at 650° C. for 2 h at a temperature increase rate of 10° C./min. The formed matte is crushed in a ring mill to an average particle size of less than 25 microns. The alkaline multi-phase aluminosilicate powder is used as another polymerisation aid, Ca-glass.

One part dry mix (mass percentage): 5.0% K-glass polymerisation aid, 0.5% Ca-glass polymerisation aid, 0.5% sodium sulphate, 47% granulated slag (a glassy calcium aluminosilicate material of 32.49% $SiO_2$, 14.39% $Al_2O_3$, 0.27% $Na_2O$, 0.48% $K_2O$, 42.04% CaO, 7.08% MgO and 0.30% $Fe_2O_3$, an average size of less than 25 microns), and 47% Gladstone fly ash (Pozzolanic Enterprises Pty. Ltd., Queensland, Australia, 50% less than 8.47 µm and 1% greater than 110 µm in size, a composition of 46.2% $SiO_2$, 30.3% $Al_2O_3$, 0.27% $Na_2O$, 0.56% $K_2O$, 4.31% CaO, 1.52% MgO, 1.66% $TiO_2$ and 12.6% $Fe_2O_3$).

Mortar: 2.5 kg dry mix and 0.78 kg water
Setting time: 3 h 35 min at 22° C.
Compressive strength (23° C. curing and 100% humidity): 56 MPa@7 d, 64 MPa@14 d, 72 MPa@28 d, 85 MPa@90 d.

It will of course be realised that the above has been given only by way of illustrative example of the invention and that all such modifications and variations thereto as would be apparent to those of skill in the art are deemed to fall within the broad scope and ambit of the invention as herein set forth.

The invention claimed is:

1. A dry mix cement composition including an alkaline multi-phase aluminosilicate material, wherein the alkaline multi-phase aluminosilicate material provides a source of alkaline and soluble silicate to the cement composition, wherein the alkaline multi-phase aluminosilicate material is formed by activating an aluminosilicate material in the presence of an alkali material, wherein the alkali dosage is from 10-300% w/w of the aluminosilicate material to be activated, and wherein an oxidant is used during the activation.

2. A dry mix cement composition according to claim 1, wherein activation is selected from the group consisting of chemical activation at elevated temperature, mechanochemical activation, microwave heating performed in a microwave heating system until a matte is formed, and heating using infrared or electromagnetic energy.

3. A dry mix cement composition according to claim 1, wherein the alkali material is selected from the group consisting of K, Na, Ca and Li, carbonates of K, Na, Ca or Li, silicates of Na and K, and combinations thereof.

4. A dry mix cement composition according to claim 1, wherein the oxidant is selected from the group consisting of sodium peroxide, calcium peroxide, sodium nitrate, potassium nitrate, sodium perborate, sodium percarbonate, sodium hypochlorite, calcium hypochlorite, and calcium percarbonate.

5. A dry mix cement composition according to claim 1, wherein the oxidant dosage is from 10-200% w/w of the alkali material.

6. A dry mix cement composition according to claim 1, wherein the aluminosilicate material used to form the alkaline multi-phase aluminosilicate material is selected from the group consisting of shales, clays, feldspars, plagioclase, feldspathic materials, zeolite, pyroxene, amphibole, volcanic ashes, mine tailings, flyashes, slags, discards from coal or ore mining, Portland cements and any combination thereof.

7. A dry mix cement composition according to claim 1, wherein the Si/Al ratio in the aluminosilicate material or mixture of aluminosilicate materials used to form the alkaline multi-phase aluminosilicate material is from 1 to 6.

8. A dry mix cement composition according to claim 1, wherein the alkaline multi-phase aluminosilicate material has an average particle size of less than 50 microns.

9. A dry mix cement composition according to claim 1, including Portland cement in an amount of up to 30% (w/w), a setting control agent, or at least one additional aluminosilicate material.

10. A dry mix cement composition according to claim 1, including, as a source of calcium, a glassy calcium silicate material.

11. A dry mix cement composition according to claim 10, including a glassy sodium or potassium silicate material.

12. A dry mix cement composition including an alkaline multi-phase aluminosilicate material, wherein the alkaline multi-phase aluminosilicate material provides a source of alkaline and soluble silicate to the cement composition, and also including sodium sulphate, as a solid activator, in an amount of up to 8% (mass ratio of the dry mix).

13. A dry mix cement composition according to claim 12, wherein the aluminosilicate material used to form the alkaline multi-phase aluminosilicate material is selected from the group consisting of shales, clays, feldspars, plagioclase, feldspathic materials, zeolite, pyroxene, amphibole, volcanic ashes, mine tailings, flyashes, slags, discards from coal or ore mining, Portland cements and any combination thereof.

14. A dry mix cement composition according to claim 12, wherein the Si/Al ratio in the aluminosilicate material or mixture of aluminosilicate materials used to form the alkaline multi-phase aluminosilicate material is from 1 to 6.

15. A dry mix cement composition according to claim 12, wherein the alkaline multi-phase aluminosilicate material has an average particle size of less than 50 microns.

16. A dry mix cement composition according to claim 12, including Portland cement in an amount of up to 30% (w/w), a setting control agent, or at least one additional aluminosilicate material.

17. A dry mix cement composition according to claim 12, including, as a source of calcium, a glassy calcium silicate material.

18. A dry mix cement composition according to claim 12, including a glassy sodium or potassium silicate material.

19. A dry mix cement composition including an alkaline multiphase aluminosilicate material, wherein the alkaline multi-phase aluminosilicate material provides a source of alkaline and soluble silicate to the cement composition, and wherein carboxylic acids and/or polycarboxylic acids are selectively absorbed to the surface of glassy materials within the dry mix cement composition.

20. A dry mix cement composition according to claim 19, wherein the carboxylic acid is 2,3-dihydroxybutanedioic acid.

21. A dry mix cement composition according to claim 19, wherein the aluminosilicate material used to form the alkaline multi-phase aluminosilicate material is selected from the group consisting of shales, clays, feldspars, plagioclase, feldspathic materials, zeolite, pyroxene, amphibole, volcanic ashes, mine tailings, flyashes, slags, discards from coal or ore mining, Portland cements and any combination thereof.

22. A dry mix cement composition according to claim 19, wherein the Si/Al ratio in the aluminosilicate material or mixture of aluminosilicate materials used to form the alkaline multi-phase aluminosilicate material is from 1 to 6.

23. A dry mix cement composition according to claim 19, wherein the alkaline multi-phase aluminosilicate material has an average particle size of less than 50 microns.

24. A dry mix cement composition according to claim 19, including Portland cement in an amount of up to 30% (w/w), a setting control agent, or at least one additional aluminosilicate material.

25. A dry mix cement composition according to claim 19, including, as a source of calcium, a glassy calcium silicate material.

26. A dry mix cement composition according to claim 25, including a glassy sodium or potassium silicate material.

\* \* \* \* \*